United States Patent

[11] 3,581,752

| [72] | Inventors | Adolf Schoepe<br>1620 North Raymond Ave., Fullerton, 92631;<br>Fredric E. Schmuck, 535 Century Drive, Anaheim, Calif. 92805 |
|---|---|---|
| [21] | Appl. No. | 811,334 |
| [22] | Filed | Mar. 28, 1969 |
| [45] | Patented | June 1, 1971 |

[54] METHOD OF CONTROLLING FLOW THROUGH A BALL COCK WITH MINIMUM FLOW NOISE AND IMPROVED FILTERING
3 Claims, 5 Drawing Figs.

[52] U.S. Cl. .................................................. 137/1, 137/414, 137/437, 137/441, 137/549
[51] Int. Cl. ........................................................ E03d 1/33, E03d 9/14
[50] Field of Search ........................................... 137/1, 414, 436, 437, 441, 549; 251/127, 217; 138/42

[56] References Cited
UNITED STATES PATENTS

| 2,532,973 | 12/1950 | Wallentin .................. | 138/42X |
| 2,561,457 | 7/1951 | Beales ........................ | 138/42X |
| 2,770,250 | 11/1956 | Smith ......................... | 137/437X |
| 2,779,350 | 1/1957 | Owens ........................ | 137/436X |

Primary Examiner—Alan Cohan
Attorney—Mahoney, Hornbaker & Schick

ABSTRACT: Water flow is directed through a ball cock inlet member centrally into a valve housing, over an annular valve seat controlled by a movable sealing member, and reversely along the inlet member outer side directly into a filtering chamber. From the filtering chamber, all of the water flow is filtered through a series of slots into an outlet chamber, a portion of said flow passing directly through said outlet chamber without further filtering into a refill hose outlet and the remainder thereof being directed circuitously inwardly again along the inlet member outer side and finally outwardly into the interior of a tank mounting said ball cock. All of the ball cock surfaces over which the water flows in passing through the ball cock into the tank interior are formed of sound deadening materials, the major portion thereof being plastic and the remainder a resilient material.

PATENTED JUN 1 1971

INVENTORS
ADOLF SCHOEPE,
FREDRIC E. SCHMUCK
BY
MAHONEY, HORNBAKER
& SCHICK
ATTORNEYS

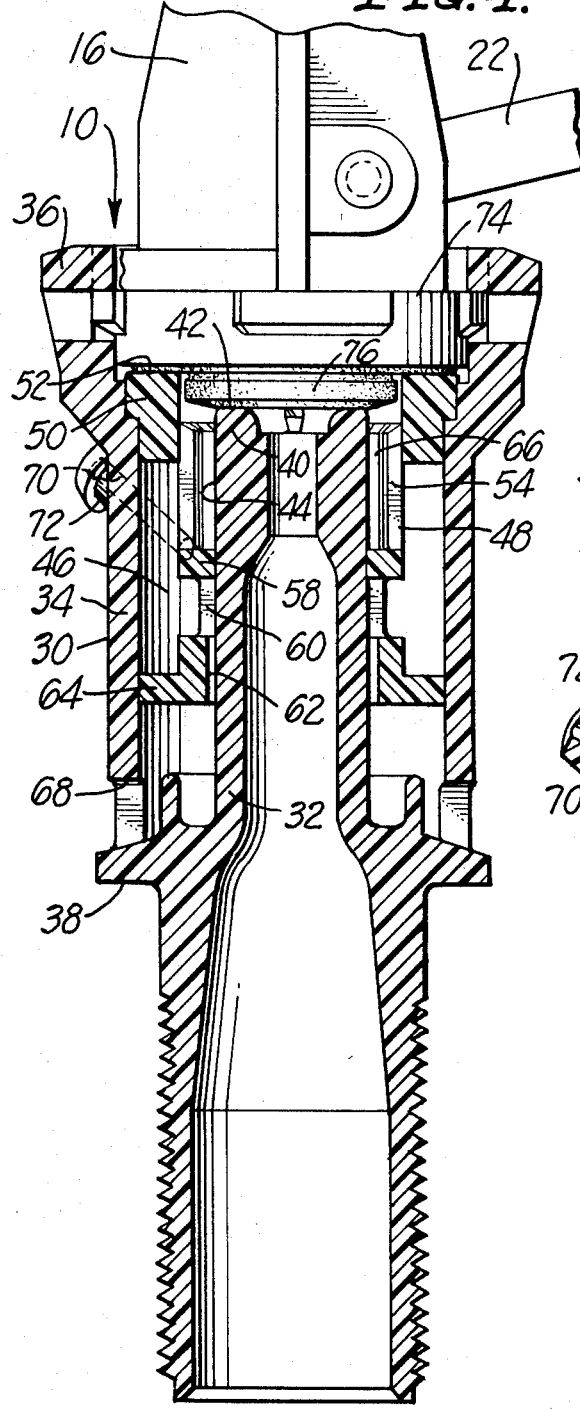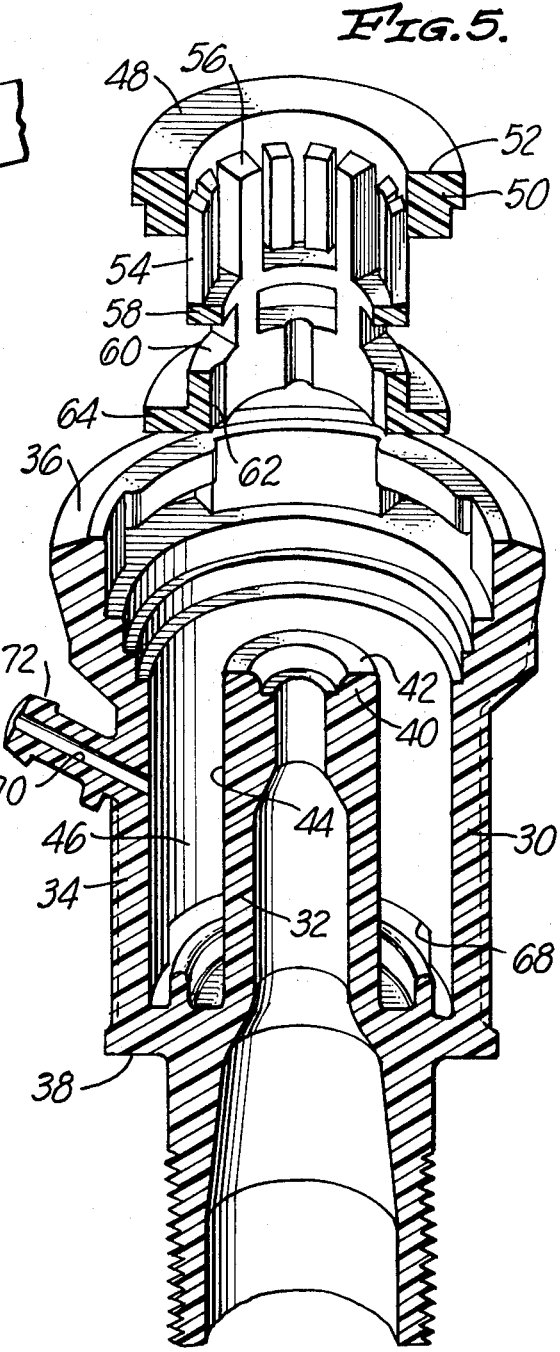

METHOD OF CONTROLLING FLOW THROUGH A BALL COCK WITH MINIMUM FLOW NOISE AND IMPROVED FILTERING

CROSS-REFERENCE TO RELATED APPLICATION

The method of this invention involves a ball cock which is an improvement on the invention disclosed and claimed in our prior U.S. Pat. No. 3,429,333, issued Feb. 25, 1969, entitled, "Ball Cock."

BACKGROUND OF THE INVENTION

This invention relates to a method of controlling flow through a ball cock with minimum flow noise and improved filtering. More particularly, the method of the present invention involves the controlled flow of water through a ball cock into a water tank interior by the directing of such water flow totally over sound deadening surfaces, the major portion of which are plastic surfaces and the remainder of a resilient material, thereby reducing the flow noise to a minimum of the water flow through the ball cock. Furthermore, the method of the present invention involves the simultaneous filtering of all of the water flowing through the ball cock and prior to any separation of such water flow into refill hose and main flow portions, thereby accomplishing the water filtering by a single filter means and eliminating the prior separate filtering of the divided water flows.

In the ball cock of our said prior U.S. Pat. No. 3,429,333, a metal water inlet member extends upwardly through the bottom wall of a water or flush tank into the tank interior and the upper end thereof is telescopically assembled with the metal lower half of a valve housing. Also, a tubular plastic water outlet member is telescoped over the inlet member beneath the valve housing lower half forming with the inlet member a water outlet chamber communicating outwardly into the tank interior and also with a refill hose. A plastic upper half of the valve housing is assembled with the lower half thereof and encloses a resilient sealing member controlling the inlet flow of water over a valve seat in the housing lower half between the inlet member and the outlet chamber, the sealing member movement thereby controlling the flow of water into the water tank.

Still further according to our prior U.S. Pat. No. 3,429,333, an upright guide or mast is formed integrally on the valve housing upper half extending upwardly therefrom and vertically slidably mounting a water level control float. The float is operably connected through a connecting arm to an operating lever of the valve so that movement of the float downwardly opens said valve permitting the inflow of water into the tank and float upward movement closes the valve by moving the sealing member against the valve seat blocking water flow into the tank. When the water is flowing through the assembly into the tank, a portion thereof is directed from the water chamber into the refill hose, said refill hose extending upwardly and depositing the water into the upper end of a refill tube.

In the particulars of configuration of the water outlet member for this prior ball cock construction, a series of spaced fingers are formed in the water chamber thereof adjacent the outlet to the refill hose with the portion of water flow passing from the outlet chamber to the refill hose being filtered therethrough. In addition, an annular series of spaced slots are formed in the outlet member within the outlet chamber in the path of flow of said water through said outlet chamber and outwardly to the tank interior, again filtering the water prior to entering the tank interior. As a result, a portion of the water entering the outlet chamber passes through the filtering fingers into the refill hose and the remainder of such water passes through the filtering slots, circuitously downwardly within the outlet member and around the outer side of the inlet member, and ultimately outwardly through a series of outlet member openings into the tank interior.

Not only does this double filtering outlet member configuration require relatively complex part-molding techniques, but the overall multiple part flow control assembly requires a somewhat complicated production assembly operation wherein alignments are critical. Also, due to the fact that the water inlet member and the valve housing lower half are formed of metal, some noise of water flow is encountered despite the fact that the water is directed circuitously through the water outlet member for a reduction of such fluid noise. Still additionally, and extremely important where relatively corrosive waters are involved, such as sea water and the like, the metal formation of the water inlet member and valve lower housing have presented some corrosion problems.

OBJECTS AND SUMMARY OF THE INVENTION

It is, therefore, an object of this invention to provide a method of controlling flow through a ball cock with minimum flow noise and improved filtering wherein all of the water flow through the ball cock is over ball cock surfaces formed totally of sound deadening materials, the major portion thereof being plastic surfaces and the remainder being resilient material surfaces. All of the ball cock water inlet member, water outlet member, filtering member and valve housing are preferably formed of molded plastic with the sealing member within the valve housing being formed of a resilient material so that virtually all of the surfaces contacted by the water during the flow through the ball cock are sound deadening surfaces so as to minimize flow noises. In this manner, improved flow noise characteristics for the ball cock are provided.

It is a further object of this invention to provide a method of controlling flow through a ball cock with minimum flow noise and improved filtering wherein the entire water flow within the ball cock is simultaneously filtered and does not require separate filtering of divided streams thereof prior to one stream passing into the refill hose and the other stream passing downwardly through the ball cock and into the interior of a water tank. The incoming water flow is directed within the ball cock over an annular valve seat controlled by the resilient sealing member, and immediately upon passing over such valve seat, the entire water flow is directed immediately into a filtering chamber prior to passing outwardly within the ball cock into the main water outlet chamber. The only path of exit of the water flow from the filtering chamber is through a series of restricting filtering slots, thereby requiring complete filtering thereof as the water flow passes into the main water outlet chamber.

As the water flow exits the filtering chamber and enters the main water outlet chamber, a portion thereof passes directly through said outlet chamber into the outlet opening communicating with the refill hose. At the same time, the remainder of such water flow is forced circuitously through the remainder of the ball cock and ultimately outwardly thereof into the interior of the water tank. Thus, complete filtering of the water flow through the ball cock is accomplished in a single filtering operation and dual filtering for separate water flow streams is not required.

Other objects and advantages of the invention will be apparent from the following specification and the accompanying drawings which are for the purpose of illustration only.

BRIEF DESCRIPTION OF THE DRAWINGS

FIG. 4 is an enlarged, fragmentary vertical sectional view, part in side elevation, showing the details of the fluid flow control assembly of the ball cock of FIG. 1; and FIG. 5 is an enlarged, exploded vertical sectional perspective view of a part of the fluid flow control assembly of the ball cock of FIG. 1.

DESCRIPTION OF THE BEST EMBODIMENT CONTEMPLATED

Figure 1:
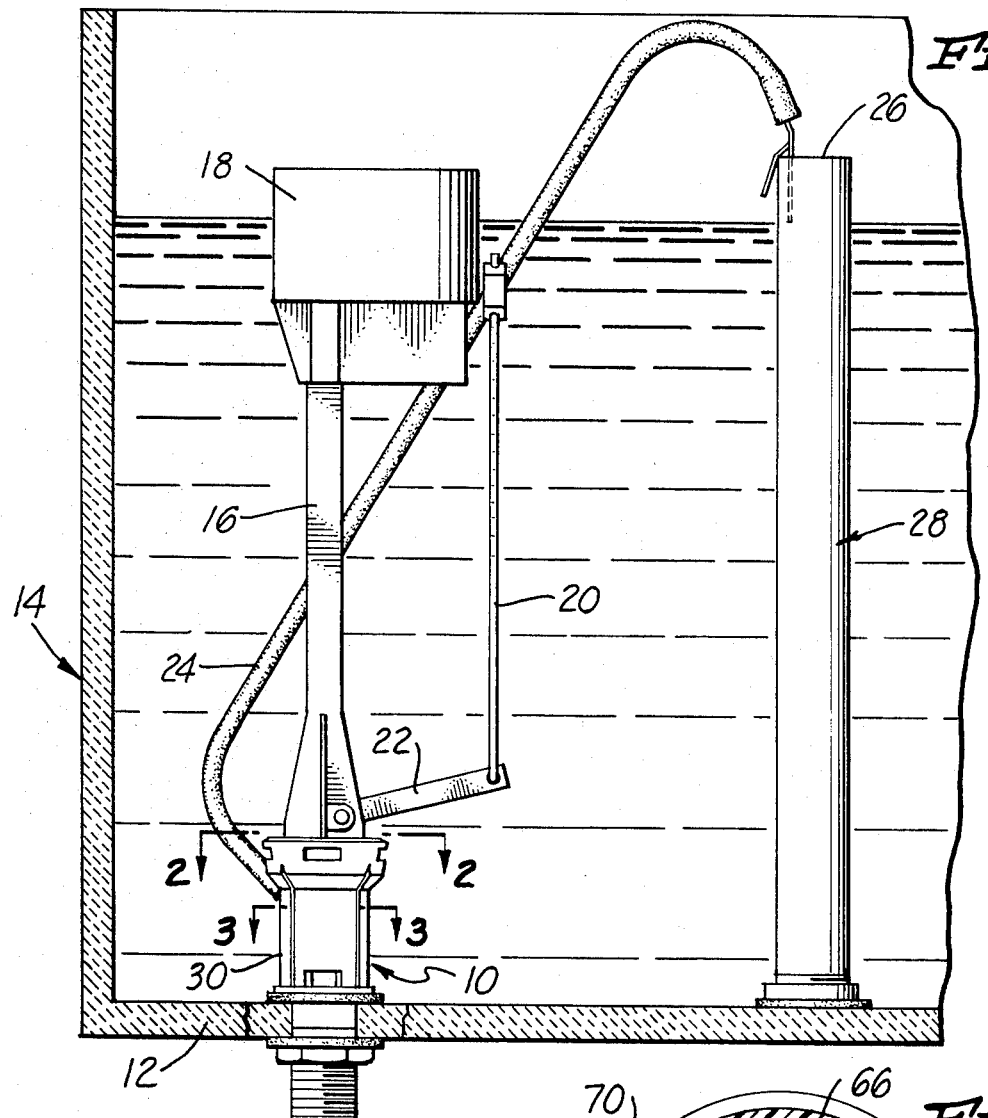
FIG. 1 is a side elevational view of an embodiment of ball cock incorporating the flow control methods of the present invention, said ball cock being mounted in a water or flush tank shown in vertical section with the ball cock refill hose being mounted for directing water into a refill tube.

Referring to FIG. 1 of the drawings, the embodiment of ball cock arranged for carrying out the flow control methods of the present invention includes a lower fluid control assembly generally indicated at 10 secured extending through a bottom wall 12 of a usual water or flush tank generally indicated at 14. The ball cock lower assembly 10 supports an upright mast or guide 16 which vertically slidably mounts a float 18 operably connected to the ball cock lower assembly 10 through a connecting arm 20 and a valve operating lever 22 so that as the water level in the tank 14 drops moving the float downwardly the ball cock lever assembly is opened permitting water to flow therethrough into the tank and a rise in the tank water level closes the ball cock lower assembly sealing off water flow therethrough. During the open position of the ball cock lower assembly 10 and the flow of water therethrough into the interior of the water tank 14, a portion of the water flow is directed by the lower assembly into a flexible refill hose 24 and upwardly into an open upper end 26 of a usual refill tube generally indicated at 28.

More particularly to the principles of the present invention, the ball cock lower assembly 10 is formed by a unitary, preferably injection-molded plastic, water flow director 30 comprised of a central water inlet portion 32 and an integral outwardly telescoping water outlet portion 34 having an integral upward extension forming a valve lower housing portion 36. Both the water inlet and outlet portions 32 and 34 are tubular in configuration, the water inlet portion being secured extending through the tank bottom wall 12 connected to a usual supply of water and the overall water flow director 30 being supported at the tank bottom wall on a horizontal flange surface 38 at the lower end of the water inlet portion. The water inlet portion 32 terminates upwardly within the tank interior at the valve lower housing portion 36 in an upper end 40 opening into the valve lower housing portion and forming an annular valve seat 42, with the water outlet portion 34 being spaced outwardly surrounding an outer side 44 of the water inlet portion and forming a water outlet chamber 46 also opening upwardly into the valve lower housing portion but in an annular zone outwardly of the valve seat 42.

A water filter member 48, also preferably formed of plastic by injection molding, is slidably assembled downwardly into the water outlet chamber 46 through the valve lower housing portion 36. The filter member 48 is comprised of an annular upper clamping flange 50 outwardly sealingly engaged with the water outlet portion 34 and forming an upper clamping surface 52 at the valve lower housing portion 36 spaced outwardly of the valve seat 42. The filter member 48 also includes a cylindrical slotted wall 54 extending downwardly along, but spaced outwardly from, the outer side 44 of the water inlet portion 32, engaging said water inlet outer side by a series of circumferentially spaced inward projections 56 adjacent the valve seat 42 and terminating downwardly in a continuous, annular intermediate baffle 58.

Below the intermediate baffle 58, the filter member 48 continues downwardly outwardly abutting and surrounding the inlet portion outer side 44, having a series of circumferentially spaced water flow openings 60 opening inwardly against the inlet portion outer side and communicating downwardly with a series of circumferentially spaced flow slots 62 opening downwardly into a lower portion of the water outlet chamber 46 inwardly of a lower, annular baffle 64 outwardly engaged with the water outlet portion 34. Thus, the filter member 48 outwardly seals the upper end of the water outlet chamber 46 blocking outward flow of water within the valve lower housing portion 36 over the valve seat 42 and forcing the water to flow downwardly into a filtering chamber 66 formed by the filter member adjacent the inlet portion outer side 44 and within or as a part of the water outlet chamber. From the filtering chamber 66, the water is forced to flow and be filtered outwardly through the filter member slotted wall 54 into the main part of the water outlet chamber 46 by the filter member intermediate baffle 58 so that all water entering the main part of the water outlet chamber 46 is subject to such filtering.

At the lower termination of the water outlet chamber 46, an upright annular baffle is formed intermediate the water inlet and outlet portions 32 and 34, and the water outlet portion is provided with a series of circumferentially spaced water outlet slots or openings 68 communicating outwardly with the interior of the water tank 14. Furthermore, spaced below the upward extension forming the valve lower housing portion 36, the water outlet portion 34 is provided with a refill outlet 70 therethrough formed partially by an integral, angularly upwardly projection, refill hose nipple 72. The refill hose nipple 72 is telescoped by an end of the refill hose 24 so that the refill outlet 70 directs a portion of the water within the water outlet chamber 46 into the refill hose and upwardly into the upper end 26 of the refill tube 28 when water is flowing through the water outlet chamber.

Figure 2:
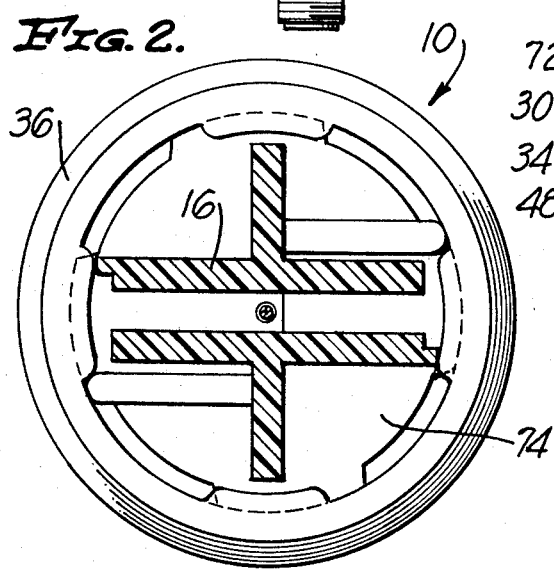
FIG. 2 is an enlarged, horizontal sectional view looking in the direction of the arrows 2-2 of FIG. 1.
Figure 3:
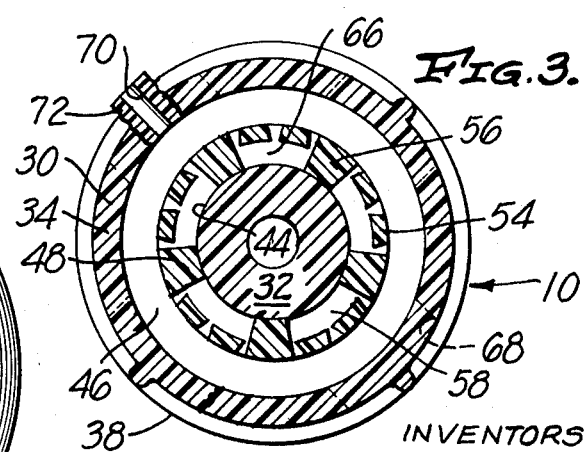
FIG. 3 is an enlarged, horizontal sectional view looking in the direction of the arrows 3-3 in FIG. 1.

A preferably injection molded plastic, valve upper housing portion 74 is assembled received downwardly within the valve lower housing portion 36, being bayonet joint secured therewith and with said lower housing portion enclosing a resilient material sealing member 76. During the assembly of the valve lower and upper housing portions 36 and 74, the valve upper housing portion clamps an outer annular zone of the sealing member 76 downwardly against the filter member clamping surface 52 as shown in FIG. 4, thereby completing the blocking of the water flow over the valve seat 42 and outwardly of the upper open end of the filtering chamber 66. As best seen in FIGS. 2 and 4, the mast 16 is preferably formed integral with the valve upper housing portion 74 with the valve operating lever 22 pivotally mounted thereon and being operably connected controlling the upward and downward movement of the sealing member 76 away from and against the valve seal 42.

In operation of the ball cock of the present invention, therefore, downward movement of the float 18 permitted by a drop in the water level within the water tank 14 pivots the outer end of the valve operating lever 22 downwardly and permits movement of the valve sealing member 76 upwardly away from the valve seal 42. Water flows inwardly through the water inlet portion 32 of the water flow director 30, over the valve seat 42 beneath the valve sealing member 76 and downwardly into the filter member filtering chamber 66. From the filtering chamber 66, the water flows outwardly into the main portion of the water outlet chamber 46 within the water outlet portion 34, it being particularly noted that all of such water flowing into the water outlet chamber is filtered through the slotted wall 54 of the filter member 48.

A portion of the water flowing into the water outlet chamber 46 is passed directly into the refill outlet 70 and the refill hose nipple 72 into the refill hose 24 for ultimate direction into the refill tube 28. The remainder of the water flowing into the water outlet chamber 46 through the filter member 48 is directed circuitously downwardly through the filter member flow openings 60 and flow slots 62, over the lower baffle 64 and outwardly of the water outlet portion 34 through the water outlet openings 64 into the interior of the water tank 14. A rise in the water level of the water tank 14 moves the float 18 upwardly pivoting the outer end of the valve operating lever 22 upwardly and ultimately moving the valve sealing member 76 downwardly against and sealing over the valve seat 42, thereby sealing off the flow of water from the water inlet portion 32 of the water flow director 30.

According to the present invention, therefore methods of controlling flow through a ball cock with minimum flow noise and improved filtering are provided by forming the ball cock water inlet and outlet portions 32 and 34, the valve lower and upper housing portions 36 and 74, and the resilient valve sealing member 76 all of sound deadening materials so that all of the surfaces over which the water flows through the ball cock into the interior of the water tank 14 are sound deadening surfaces. The result is that the water flow through the ball cock according to the methods of the present invention has the flow noise thereof reduced to a minimum and less than that of the prior ball cock constructions.

Further, according to the present invention, the flow control methods of the present invention providing the improved and simplified filtering of the water flow through the ball cock are accomplished by directing the entire water flow from the valve seat 42 directly into the filtering chamber 66 prior to such flow entering the main part of the water outlet chamber 46 and prior to such water flow being divided into the separated flow streams for the refill hose 24 and the main flow into the interior of the tank 14. Thus, only a single filtering operation is required and separate filtering operations after such flow division is completely eliminated.

We claim:

1. In a method of controlling water flow through a ball cock controlling the flow into and the water level within a water tank, the steps of: directing water flow through a water inlet member centrally into a valve housing over an annular, sealing member controlled, valve seat and from said valve housing immediately reversely along an outer side of said inlet member into a filtering chamber; blocking said water flow along said inlet member outer side spaced from said valve housing forcing said water flow in a flow direction sharply angled relative to the flow direction into said filtering chamber outwardly into an adjacent outlet chamber; filtering a portion of said water flow from said filtering chamber at said sharply angled flow direction outwardly away from said inlet member outer side into said adjacent outlet chamber and directly in a generally straight path through said adjacent outlet chamber into a refill hose outlet; simultaneously with said flow portion filtering, filtering the remainder of said water flow from said filtering chamber at said sharply angled flow direction outwardly away from said inlet member outer side into said adjacent outlet chamber; and directing said water flow remainder circuitously along said adjacent outlet chamber generally away from said valve housing, then at a sharp angle reversely inwardly against said water inlet member and at a sharp angle along said water inlet member in a direction away from said valve housing, then reversely outwardly from said water inlet member, and ultimately from said outlet chamber into an interior of said tank.

2. A method as defined in claim 1 in which all of said directing and filtering steps include the muffling of said water flow during the directing and filtering of said water flow by the directing by and the filtering through water flow sound deadening surfaces of plastic and resilient material.

3. A method as defined in claim 1 in which all of said directing and filtering steps include the muffling of said water flow during the directing and filtering of said water flow by the directing by and filtering through water flow sound deadening surfaces of plastic and resilient material; and in which said steps of filtering said flow portion and said flow remainder each include the filtering of said flow by forcing said flow through separating and confining spaces formed by a series of restricting slots at said sharply angled flow direction away from said inlet member outer side into said outlet chamber.